May 5, 1942.　　　　E. J. BENES　　　　2,282,156
FISHING REEL SPOOL
Filed Feb. 14, 1941
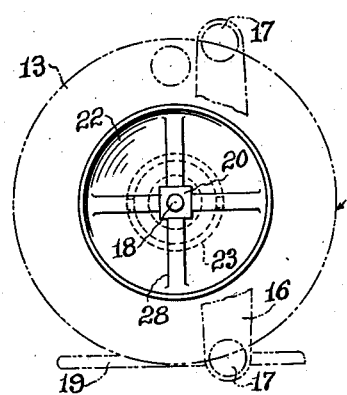
Fig. 2
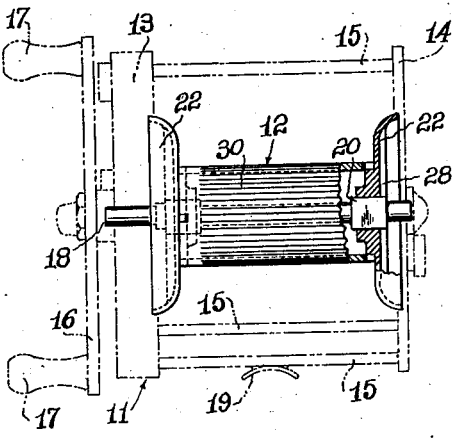
Fig. 1
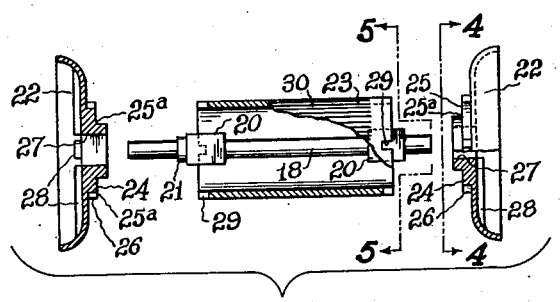
Fig. 3
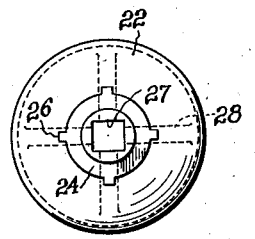
Fig. 4
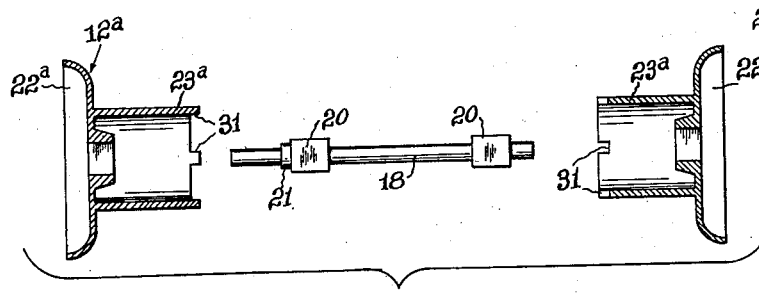
Fig. 6
Fig. 5
INVENTOR:
EDWIN J. BENES
BY Walter C. Kelsey
ATTORNEY.

Patented May 5, 1942

2,282,156

UNITED STATES PATENT OFFICE 2,282,156

FISHING REEL SPOOL

Edwin J. Benes, Cleveland, Ohio

Application February 14, 1941, Serial No. 378,926

1 Claim. (Cl. 242—119)

My invention relates to improvements in spools for fishing reels, and the like.

The advantages of using a light weight fishing reel spool having a relatively large diameter are well known in the art, as such construction permits accurate casting, due to the ability of the spool to start and stop quickly, the latter feature preventing over-running of the line. Cork arbors are frequently placed around such spools in order to increase the spool diameter to meet desired spool sizes for certain uses without materially adding to the weight of the reel. Cork arbors, however, add materially to the cost of reels and have been found to be unsatisfactory, due to the elasticity of such material, which permits a cork arbor to be squeezed or compressed out of shape in usage, resulting in an unbalanced and uneven arbor, which is unsatisfactory for obtaining best results.

I have discovered that a fishing reel spool, of relatively large diameter and relatively light weight, and thus having a relatively low moment of inertia, can be constructed as a built-in feature in a reel by manufacturing such spool of a light material such as a plastic material or the like, and by disposing and arranging the parts, as hereinafter disclosed.

Therefore, an object of my invention is to provide a light-weight fishing reel spool with a built-in arbor, which weighs materially less than a spool formed of such metals as brass, aluminum, or the like, said construction being provided without sacrificing any of the strength of such spool. Another object is to provide a reel spool of relatively large arbor diameter with a relatively low moment of inertia.

Other objects are to provide a spool, which due to its simplicity of construction, can be produced at a relatively low cost, such spool being formed of a material which is resistant to salt water, alkali and acids, and hence adapted to be widely used in varying climatic and weather conditions.

Another object is to provide a reel spool which will always remain round and balanced in spite of constant heavy usage.

Another object is to provide a spool, which can easily be made of any color or combination of colors adapted to match the reel handles, thereby enhancing the appearance of the reel without using inlays, engraving, or other relatively expensive decorations.

Other objects are to provide a strong, durable reel spool, adapted to be used in various types of reels, which can be used for both fresh water and salt water fishing, and to provide a plurality of varying diameters spools for each reel, which can be readily installed thereby providing arbors of varying sizes for trolling and casting operations.

These and other objects will be apparent in the course of the following description.

In the accompanying drawing forming a part of this specification:

Figure 1 is a side elevational view of a conventional fishing reel shown in broken lines, the spool being shown in full lines with parts broken away to show details of the spool construction, Figure 2 is an end view of the reel shown in Figure 1, Figure 3 is a sectional view of the parts forming the preferred form of my spool, Figure 4 is an end view taken on the line 4—4 of Figure 3, Figure 5 is an end view of shaft and arbor taken on the line 5—5 of Figure 3, while Figure 6 is a sectional view of parts forming a slightly modified form of my invention.

In the drawing, the numeral 11 refers generally to a fishing reel illustrated in Figure 1, wherein the reel spool 12 is shown in full lines, while the balance of the reel is shown in broken lines, as such reel, for the purposes of illustrating my invention, may be any one of a wide variety of fishing reels known and used by fishermen. The reel 11 comprises spaced front end plates 13 connected to a rear end plate 14 by posts 15, while an operating handle 16 provided with grasp members 17, receives centrally one end of a reel shaft 18 which is operatively secured thereto, as by a pressed fit, or in any suitable manner. Rotation of the reel shaft 18 is accomplished by holding the grasp members 17 and imparting to them a circular movement as will be readily apparent.

If desired, the center of the operating handle 16 may be offset with reference to the axis of the spool 12, and may be operatively connected thereto by means of gearing (not shown), for speeding up the rotation of the spool 12 in an obvious manner. Likewise, if desired, a so-called click mechanism, well known in the art may be added to the front or rear end plates. A conventional reel seat 19 provides means for attaching said reel 11 to a fishing pole, not shown herein, in an obvious manner. Various attachments may be included in the reel 11 itself such as anti-back-lash devices, level wind assemblies, line spreading devices, oiling devices, and the like, using my spool and arbor, hereinafter disclosed, but as my spool is adapted to be incorporated in reels including any of the foregoing attachments, it was not considered essential to illustrate such devices herein.

The preferred form of my reel spool illustrated in Figures 1, 3, 4, and 5 includes a shaft 18 formed of suitable light durable material provided intermediately of its ends with square shoulders 20, while reduced shoulders 21 may be provided, if desired, for attaching various devices, such as gears and a ratchet thereto. The shaft 18 may be square or round intermediate its end portions which are journaled in the spool, and the center portion may be ground, milled or drilled to lighten it. If it is ground or milled, such work is done between the surfaces which hold to the spool flanges.

The spool illustrated in Figures 1, 3, 4, and 5 comprises two generally disc-shaped spool flanges 22 connected by a cylindrical sleeve or arbor 23. The flanges 22 and the arbor 23 may be made of suitable light weight metal and the ends of the arbor 23 may be joined to shoulders on the spool flanges by a press fit and then soldered and welded, to hold them firmly in place. I have discovered that light thermoplastic materials capable of being molded or modeled into desired shapes or forms, which in completed form are highly resistant to water, possess the characteristic of machinability, are oil resistant, may be produced in various color combinations, do not become brittle, are extremely light weight, and durable, and may be satisfactorily used. Examples of such types of plastic materials adapted to be satisfactorily used for such spools are identified by the names, phenolic, cellulose-acetate, aceto-butyrate, ethyl-cellulose, methyl-methacrylate, vinyl, polystyrene, and many others.

The above enumerated synthetic plastic materials possess the desired characteristic in varying degrees. For example, I have discovered that the plastic material known as "polystyrene" provides a highly satisfactory material for a spool, as it possesses relatively high flexural, tensile, and impact strengths, is highly resistant to water absorption, possesses high acid and caustic resistance properties, and undergoes relatively low dimensional change after molding. In addition to these characteristics "polystyrene" is a very light material and by using such material a spool substantially lighter than a corresponding spool formed of aluminum or brass or other metal may be provided.

The spool flanges 22 are provided centrally on their convex surfaces with bosses 24, having stepped outer surface formations providing an outer circular shoulder 25 and an inner shoulder 25a. The outer shoulders 25 are provided with radially extending locking members 26, best illustrated in Figure 4. Square apertures 27 extending centrally through the bosses 24 are adapted to receive and retain cooperating square shoulders 20 of the shaft 18. If desired, apertures 27 may be circular in cross-section and receive a round shaft, which preferably should be fluted or knurled to assure a tight fit. The concave surfaces of the spool flanges 22 may be provided with radially extending webs 28 serving to reinforce the flanges in an obvious manner. If desired two spools of varying arbor diameter may be provided, the smaller of the two may be used for trolling, and the larger one may be used for casting.

The arbor 23, preferably formed of one piece of plastic material, has an inner diameter corresponding to the outer diameter of the shoulders 25, and is provided with cooperating notches 29, of a depth slightly less than the width of the locking members 26 on the shoulder 25, said locking members being adapted to receive and retain said notches 29 for securely fastening the arbor 23 to the convex surfaces of the spool flanges 22. The outer surface of the arbor 23 is provided with longitudinally extending fluting 30, for facilitating the holding of a line thereon.

In assembling the spool 12, the shaft 18 is inserted in one of the flanges 22 with the square shoulders 20 thereof seated in the cooperating flange aperture 27, with the end of the shaft projecting a short distance beyond the opposite side of the flange. The arbor 23 is then placed over the shaft 18 and secured to the convex surface of the flange 22 by interlocking the arbor notches 29 with the locking members 26, thereby fastening the end of the arbor 23 around the circular shoulder 25 of the spool flange 22. If the arbor 23 and spool flanges 22 are of metal material the cooperating parts above described are pressed together by a press fit, and then soldered or welded together. If such parts are of plastic materials the cooperating parts are chemically welded, cemented, or bonded together in any satisfactory manner. By chemically welding the parts together a very firm union of the parts is obtained.

The opposite end of the shaft 18 is similarly secured to the opposite spool flange 22, likewise, the opposite end of the arbor 23 is similarly secured to the opposite spool flange. A spool built in accordance with the foregoing description can be molded or machined, although by molding it can be manufactured at a cost relatively much lower than it is possible to manufacture other spools.

The modified form of my invention, illustrated in Figure 6 is adapted to be made of light plastic materials in a manner corresponding generally to the spool illustrated in Figures 1 through 5. In this modified form of my invention the spool 12a has a half portion of the arbor 23a formed integrally with the spool flanges 22a and the mating ends of the arbor 23a are provided with cooperating interlocking formations 31, adapted to securely retain the ends together in an obvious manner. The parts above referred to are assembled and retained similarly to the manner described for the preferred form of my invention, with the exception of the specific manner of joining the ends of the arbor 23a together, as distinguished from seating the ends of the arbor 23, of the preferred form, on the shoulder 25 of the spool flanges 22.

From the foregoing it will be seen that my invention provides a light weight fishing reel spool having a built-in arbor of relatively large diameter, with a minimum moment of inertia. That such spool is strong, durable, and can be produced at a relatively low cost and is adapted to be used in fresh or salt water due to its construction features.

It will be apparent to those skilled in the art that the invention herein disclosed may be changed, used, or modified, without departing from the spirit of the invention or sacrificing the advantages thereof, and that the embodiment of my invention herein disclosed is illustrative only and that my invention is not limited thereto.

I claim:

In a fishing reel, the combination of, an elongated operating shaft of metal having a small diameter, a pair of spaced spool flanges formed of light weight durable plastic material fixedly mounted on said shaft and provided with integrally formed shoulders on their inner faces said shoulders being provided with locking members projecting therefrom, the diameter of said shoulders being relatively much larger than the diameter of said shaft, and a thin, hollow, elongated arbor also formed of light weight durable plastic material disposed around said shaft and mounted at its ends around said spool shoulders, said arbor ends being provided with cooperating notch formations interlocked with said shoulder locking members integrally secured thereto and thereby providing a light durable reel spool having a relatively low moment of inertia, for the purposes described.

EDWIN J. BENES.